United States Patent Office 3,140,244
Patented July 7, 1964

3,140,244
REMOVAL OF VOLATILE ORGANIC MATERIALS FROM AQUEOUS HYDROCHLORIC ACID
Joseph Simek, Edwin J. Strojny, and Alexander H. Widiger, Jr., Midland, Mich., assignors to The Dow Chemical Company, Midland, Mich., a corporation of Delaware
No Drawing. Filed Oct. 3, 1962, Ser. No. 228,023
8 Claims. (Cl. 202—46)

This invention relates to a process for the removal of volatile organic materials from aqueous hydrochloric acid. More particularly, the present invention is directed to a process for purifying aqueous hydrochloric acid resulting from organic chlorinations.

Hydrogen chloride resulting as a byproduct from substitution chlorination reactions often contains volatile organic materials as undesirable contaminants. Since the hydrogen chloride is usually collected in water, the resulting aqueous hydrochloric acid generally contains these undesirable contaminants. Removal of these organic materials has posed a problem, particularly when relatively small concentrations of organics are objectionable. Phase separation is impractical when organic concentration is very low, and various filtration and absorption means have been found to be generally unsatisfactory. Absorption media tend to become saturated so that they must be regenerated or replaced. This generally results in unwanted down time while regeneration or replacement is accomplished.

It has now been discovered that when aqueous hydrochloric acid which contains volatile organic compounds is countercurrently contacted with a gas which is non-reactive with aqueous hydrochloric acid or the organic material, the organic material may be substantially removed from the aqueous hydrochloric acid.

Generally speaking the aqueous hydrochloric acid to be treated according to the process of the present invention will result as a byproduct from a substitution chlorination procedure wherein the material chlorinated is a relatively volatile organic material. Examples of volatile organic starting materials contemplated herein include benzene, chlorobenzene, methane, ethane, propane and the like. These materials are generally chlorinated with chlorine causing substitution of the hydrogen therein, thereby generating hydrogen chloride. This hydrogen chloride will carry over a small amount of volatile starting material and product and since the hydrogen chloride is dissolved in water these organic materials will be carried into the resulting solution. Generally these organic materials are present in an amount of 10 to 350 parts per million but some processes may result in even more organic contaminant.

Excellent results are obtained where the organic contaminant is benzene, chlorobenzene, chloromethane, dichloromethane, chloroform, ethyl chloride, 1,1-dichloroethane, 1,2-dichloroethane, 1-chloropropane, 2-chloropropane, and the like. Temperature of operation is dependent on the particular organic material to be removed, and on the concentration of the aqueous hydrochloric acid. Suitable temperatures for operation are between about 10 and 60 degrees centigrade, preferably from about 15 to about 40 degrees centigrade, desirably at from about 25 to about 35 degrees centigrade.

Appropriate gases for use in the process of the present invention are air, hydrogen, nitrogen, oxygen, carbon dioxide, carbon monoxide, helium, and mixtures thereof.

Preferably the process of the present invention is carried out in a packed column, tray column, or other apparatus which assures efficient contact between the gas and the liquid. An unpacked tube can be used but the efficiency is poor. The volume ratio of gas employed to liquid treated will be between 6 and 100, depending upon many factors including the vapor pressure of the organic vapor to be removed, the concentration of the aqueous hydrochloric acid, the temperature, the type and size of contacting means, and the amount of organic contaminant present in the starting material. Contact of the gas and liquid is usually accomplished in a countercurrent flow so as to assure efficient operation and adequate contact of the liquid with the gas.

Rates at which aqueous hydrochloric acid may be treated in accordance with the present invention are dependent on the organic material to be removed, the gas used, the temperature employed, the type and size of contacting means, the concentration of the aqueous hydrochloric acid.

Employment of the process of the present invention usually results in a product of aqueous hydrochloric acid which is substantially free of organic impurities.

A better understanding of the present process may be obtained in light of the following examples which are set forth to illustrate, and are not to be construed to limit, the present invention.

EXAMPLE I

Several runs were made in which aqueous hydrochloric acid was fed to the top of a column 4 inches in diameter and 4 feet in height which was packed with ⅜ inch rings. Temperatures of aqueous hydrochloric acid feed which had specific gravities ranging from about 1.136 to about 1.178 and contained from about 35 to about 330 parts per million benzene and from about 15 to about 350 parts per million chlorobenzene, ranged from about 30 to about 45 degrees centigrade.

Air at temperatures ranging from about 10 to about 25 degrees centigrade was fed to the bottom of the column. Air was fed to the column in amounts such that the volume ratios of air to aqueous hydrochloric acid feeds ranged from about 7.5 to about 90. It was found that increasing the air to liquid volume ratio from 7.5 to somewhat in excess of 30 resulted in improvement of organic removal, while increasing the air to liquid ratio in excess of 50 generally resulted in only a small improvement in organic removal per unit of air to liquid ratio increase.

Product aqueous hydrochloric acid was removed from the bottom of the column. Benzene in the product ranged from about 2 to about 23 parts per million while chlorobenzene ranged from about 1 to about 33 parts per million, generally indicating benzene and chlorobenzene removals in excess of about 90 percent, final product organic concentrations being somewhat dependent on starting concentrations.

Air, containing benzene and chlorobenzene, was removed from the top of the column and was run through a scrubber to determine hydrochloric acid loss from the process. Analysis of the scrubber product was made in order to determine the percentage losses based on the hydrochloric acid in the feed. Hydrochloric acid losses to the air in the column ranged from about 0.2 to about 5 percent of the hydrochloric acid fed to the column. Hydrochloric acid loss was observed to be generally proportional to the air to liquid ratio as predicted from available vapor pressure data.

Operation of the present process utilizing the packed column described above is preferably accomplished with an air to acid volume ratio of from about 7.5 to about 50. A lower ratio results in poorer removal of the organic material from the aqueous hydrochloric acid whereas increasing the air to acid volume ratio to greater than 50 results in a greater loss of hydrochloric acid without substantial increase in organic removal.

EXAMPLE II

Several runs were made utilizing substantially the same procedure set forth in Example I, but with a 4 inch diameter column having eight sieve trays spaced 7 inches apart. Each sieve tray had 63 holes, 1/8 inch in diameter. Aqueous hydrochloric acid, containing benzene and chlorobenzene, entered the top of the column and air entered the bottom of the column. Purified aqueous hydrochloric acid was removed from the bottom of the column, benzene and chlorobenzene-containing air was removed at the top.

Results of the experiment using the sieve tray column were substantially similar to the results obtained with a packed column with the exception that better removal of benzene and chlorobenzene was accomplished for a given air to liquid volume ratio.

EXAMPLE III

For comparison a series of runs was made in which aqueous hydrochloric acid, containing benzene and chlorobenzene, was fed through charcoal filters in an attempt to remove the organic impurities. Summary results follow in Table I.

Table I

| Run | Feed (p.p.m.) | | Product | |
|---|---|---|---|---|
| | Benzene | Chlorobenzene | Benzene | Chlorobenzene |
| A | 143 | 38 | 116 | 32 |
| B | 203 | 161 | 177 | 140 |
| C | 329 | 351 | 262 | 207 |
| D | 124 | 70 | 117 | 60 |

EXAMPLE IV

Using substantially the same procedures and methods outlined in Examples I and II, hydrogen, nitrogen, oxygen, carbon dioxide, carbon monoxide, helium, or mixtures thereof may be substituted for air, with substantially similar results.

Further, chloromethane; dichloromethane; chloroform; ethyl chloride; 1,1-dichloroethane, 1,2-dichloroethane; 1-chloropropane; 2-chloropropane; and the like, and mixtures thereof may be removed from aqueous hydrochloric acid by the process of the present invention with substantially the same results obtained with benzene and chlorobenzene as illustrated in Examples I and II.

Various modifications may be made in the present invention without departing from the spirit or scope thereof and it is to be understood that we limit ourselves only as defined in the appended claims.

We claim:

1. A process for the removal of volatile organic materials from aqueous hydrochloric acid comprising, countercurrently contacting said aqueous hydrochloric acid with a gas which is non-reactive with either aqueous hydrochloric acid or the volatile organic materials, in a volume ratio of gas to aqueous hydrochloric acid of from 6 to 100, thereby substantially removing said volatile organic materials from the aqueous acid, and recovering said aqueous hydrochloric acid substantially free from volatile organic materials.

2. A process for the removal of volatile organic materials from aqueous hydrochloric acid comprising, countercurrently contacting said aqueous hydrochloric acid with a gas selected from the group consisting of air, hydrogen, nitrogen, oxygen, carbon monoxide, carbon dioxide, helium, and mixtures thereof, in a volume ratio of gas to aqueous hydrochloric acid of from 6 to 100, thereby substantially removing the said volatile organic materials from the aqueous acid, and recovering said aqueous hydrochloric acid substantially free from volatile organic materials.

3. A process for the removal of volatile organic materials from aqueous hydrochloric acid comprising, countercurrently contacting said aqueous hydrochloric acid with a gas which is non-reactive with either aqueous hydrochloric acid or the volatile organic materials, in a volume ratio of gas to aqueous hydrochloric acid of from 7.5 to 90, thereby substantially removing said volatile organic materials from the aqueous acid, and recovering said aqueous hydrochloric acid substantially free from volatile organic materials.

4. A process for the removal of volatile organic materials from aqueous hydrochloric acid comprising, countercurrently contacting said aqueous hydrochloric acid with a gas which is non-reactive with either aqueous hydrochloric acid or the volatile organic materials, in a volume ratio of gas to aqueous hydrochloric acid of from 7.5 to 50, thereby substantially removing said volatile organic materials from the aqueous acid, and recovering said aqueous hydrochloric acid substantially free from volatile organic materials.

5. A process for the removal of volatile organic materials from aqueous hydrochloric acid comprising, countercurrently contacting, at a temperature of from 10 to 60 degrees centigrade, aqueous hydrochloric acid with a gas which is non-reactive with either aqueous hydrochloric acid or the volatile organic materials, in a volume ratio of gas to aqueous hydrochloric acid of from 6 to 100, thereby substantially removing said volatile organic materials from the aqueous acid, and recovering said aqueous hydrochloric acid substantially free from volatile organic materials.

6. A process for the removal of volatile organic materials from aqueous hydrochloric acid comprising, countercurrently contacting, at a temperature of from 15 to 40 degrees centigrade, aqueous hydrochloric acid with a gas which is non-reactive with either aqueous hydrochloric acid or the volatile organic materials, in a volume ratio of gas to aqueous hydrochloric acid of from 6 to 100, thereby substantially removing said volatile organic materials from the aqueous acid, and recovering said aqueous hydrochloric acid substantially free from volatile organic materials.

7. A process for the removal of volatile organic materials from aqueous hydrochloric acid comprising, countercurrently contacting, at a temperature of from 25 to 35 degrees centigrade, aqueous hydrochloric acid with a gas which is non-reactive with either aqueous hydrochloric acid or the volatile organic materials, in a volume ratio of gas to aqueous hydrochloric acid of from 6 to 100, thereby substantially removing and volatile organic materials from the aqueous acid, and recovering said aqueous hydrochloric acid substantially free from volatile organic materials.

8. A process for the removal of benzene and chlorobenezene from aqueous hydrochloric acid comprising, countercurrently contacting the aqueous hydrochloric acid with air, in a volume ratio of air to aqueous hydrochloric acid of from 6 to 100, thereby substantially removing said benzene and chlorobenzene from the hydrochloric acid, and recovering said aqueous hydrochloric acid substantially free from benzene and chlorobenzene.

References Cited in the file of this patent

UNITED STATES PATENTS

| 875,558 | Skinner | Dec. 31, 1907 |
| 2,720,280 | Doyle | Oct. 11, 1955 |
| 2,841,243 | Hooker et al. | July 1, 1958 |
| 2,904,475 | Bell | Sept. 15, 1959 |
| 2,964,385 | Cobb | Dec. 13, 1960 |